United States Patent [19]

Powell

[11] 4,010,816
[45] Mar. 8, 1977

[54] STEERABLE TRAILER

[76] Inventor: Charles R. Powell, 6729 N. Richmond Ave., Portland, Oreg. 97203

[22] Filed: Feb. 4, 1976

[21] Appl. No.: 655,107

[52] U.S. Cl. .............................. 180/144; 280/81.5; 280/404

[51] Int. Cl.² ...................... B60P 3/40; B62D 5/08

[58] Field of Search .......... 280/404, 419, 426, 442, 280/443, 81.5; 180/144, 23, 24.01, 152, 136, 139

[56] References Cited

UNITED STATES PATENTS

| 3,048,422 | 8/1962 | Payne et al. | 180/144 X |
| 3,721,358 | 3/1973 | Brock | 280/81.5 X |
| 3,873,129 | 3/1975 | Schmidt | 280/404 |

Primary Examiner—Joseph F. Peters
Assistant Examiner—John A. Pekar
Attorney, Agent, or Firm—Eugene M. Eckelman

[57] ABSTRACT

A pair of fluid operated cylinder assemblies are secured between the bunk of the trailer and a rear frame portion. An auxiliary motor, a pump driven by the motor, a reservoir, and a valve operated by solenoids to control driving functions for the pair of fluid operated cylinder assemblies is supported on the trailer. Control of the electric motor and the solenoids is accomplished by a switch located in the tractor and connected to the motor and solenoids by electric wires extending between the trailer and the tractor. The solenoids may be operated by radio receivers and remote transmitters rather than by a switch in the tractor.

7 Claims, 6 Drawing Figures

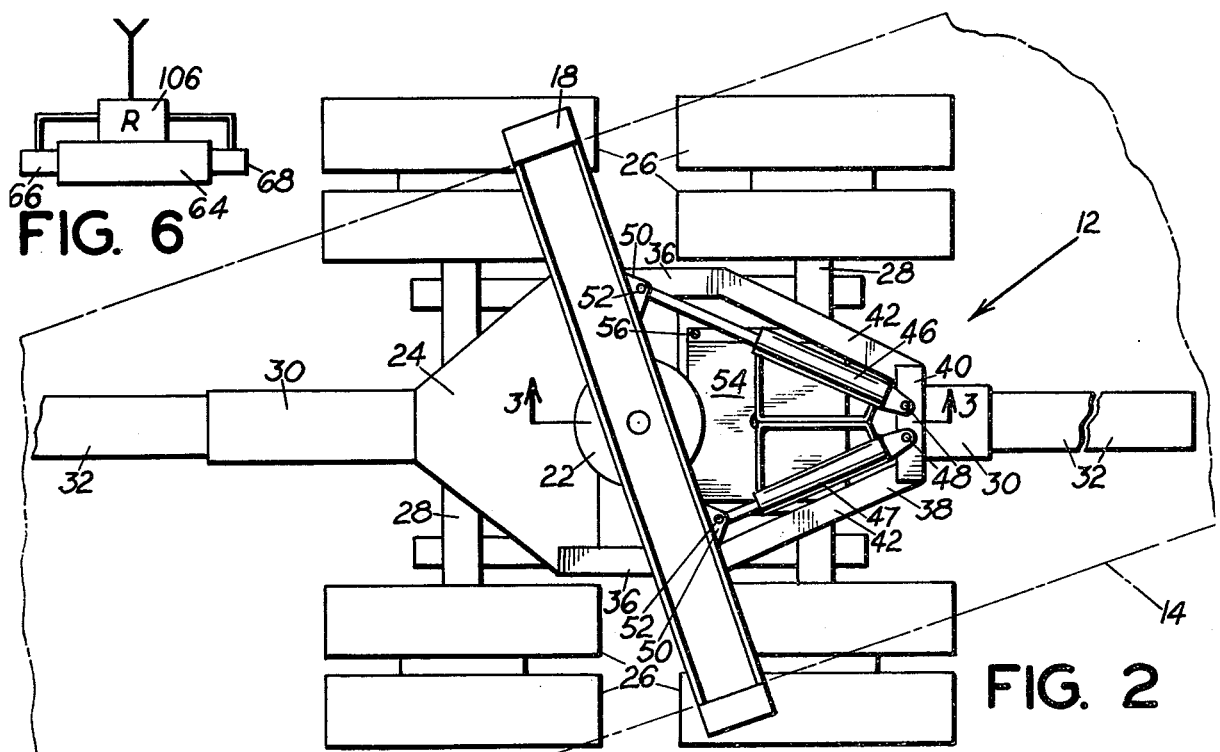
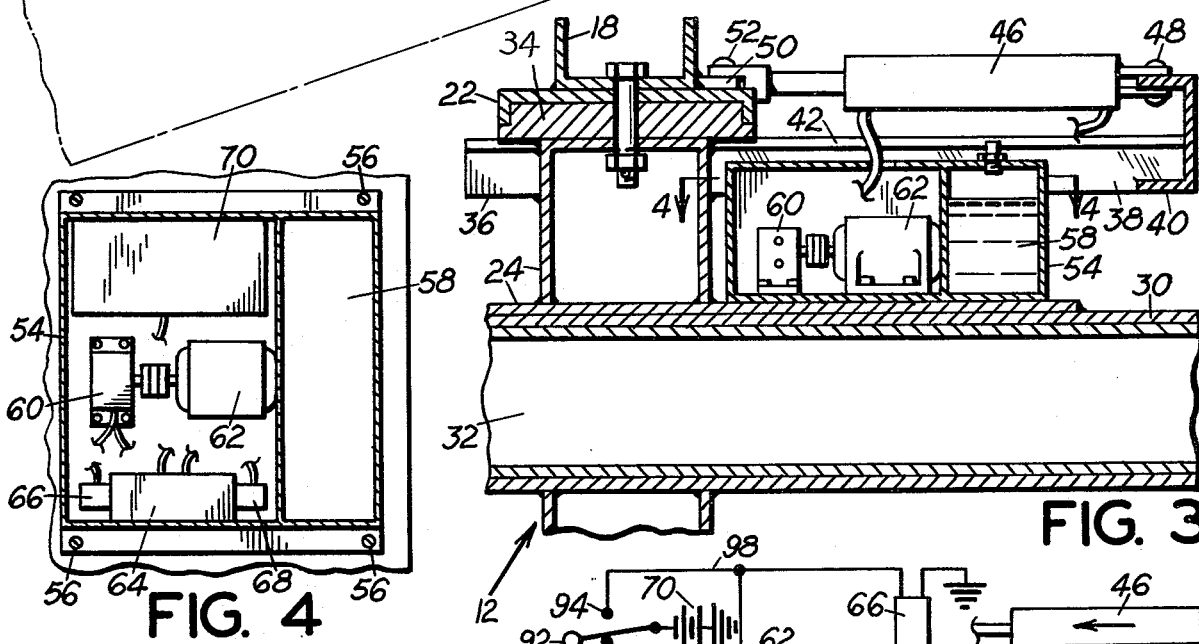
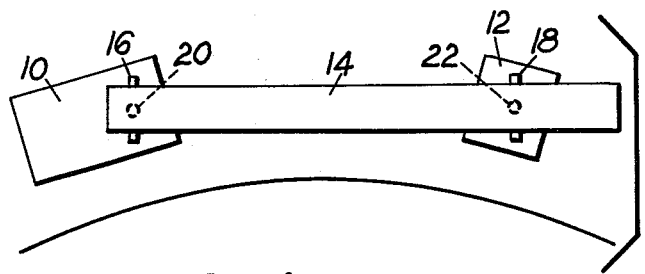
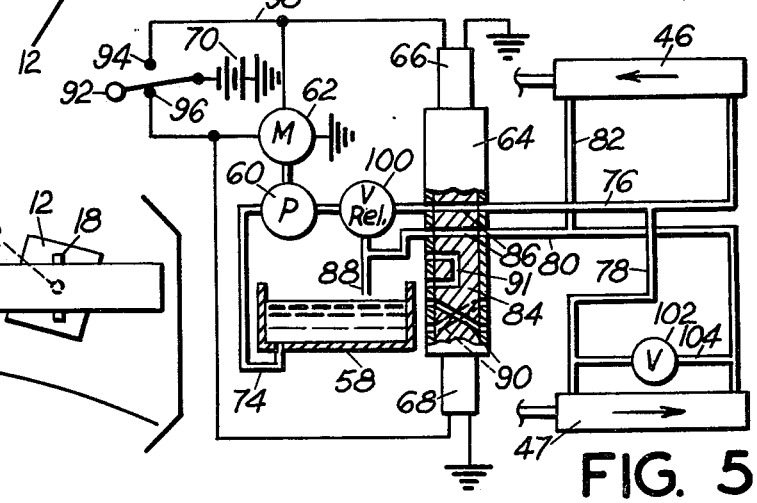

STEERABLE TRAILER

BACKGROUND OF THE INVENTION

This invention relates to the new and useful improvements in steerable trailers.

Steerable trailers have heretofore been provided for long loads and the like in order that the vehicle assembly can negotiate curves. Steerable structures heretofore employed have in one instance, such as shown in U.S. Pat. No. 3,873,129, utilized fluid operated cylinder assemblies connected between the log bunk and the trailer frame and have conduits between drive and control means for the cylinder assemblies leading from the trailer to the tractor. Such an assembly has the disadvantage that the conduits that must extend from the trailer to the tractor are bulky, expensive, and readily damaged. Another steerable apparatus utilized in the art comprises an assembly having a gasoline motor situated at the trailer and arranged to operate the fluid operated cylinder assemblies. The latter structure has the disadvantage that the gasoline motor must operate constantly and therefore is short lived and furthermore has the disadvantage of adding one more polluting type motor to the truck assembly.

SUMMARY OF THE INVENTION

According to the present invention and forming a primary objective thereof, a trailer assembly is provided that incorporates therein a complete drive assembly and operating means for steering the assembly and has an arrangement whereby the only control means extending between the trailer and the pulling tractor comprises electric wiring or if remote control means such as a radio transmitter is employed together with receiver means at the trailer, no wiring whatsoever is required.

To carry out the above objectives, the trailer supports a pair of fluid operated cylinders connected between the log bunk and wheel supported frame means for applying a steering force. The trailer has the steering components compactly mounted thereon consisting of an electric motor, storage battery means, a fluid operated pump driven by the motor and in turn driving the fluid operated cylinders, and a solenoid operated valve which controls driving functions of the fluid operated cylinders. Electric operating control means is provided in the tractor and such control means is connected to the electric motor and solenoid operated valve by electric wires extending between the trailer and the tractor, or as stated above if remote transmitting means are provided no wires need extend between the tractor and the trailer.

The invention will be better understood and additional objects and advantages will become apparent from the following description taken in connection with the accompanying drawings which illustrate preferred forms of the apparatus.

BRIEF DESCRIPTION OF THE DRAWINGS

FIG. 1 is a diagrammatic view of a tractor trailer assembly on which the present invention has particular application;

FIG. 2 is a top plan view of a trailer apparatus having the present steering mechanism secured thereto;

FIG. 3 is an enlarged, longitudinal, vertical sectional view taken on the line 3—3 of FIG. 2;

FIG. 4 is a horizontal sectional veiw taken on the line 4—4 of FIG. 3; and

FIG. 5 is a wiring and piping diagram of the present steering system.

DETAILED DESCRIPTION OF THE PREFERRED EMBODIMENT

With reference first to FIG. 1, the numeral 10 designates a pulling tractor and the numeral 12 designates a trailer. A load 14 is supported between a bunk 16 on the tractor and a bunk 18 on the trailer. The pivot between the bunk 16 and the tractor is designated by the numeral 20, and the pivot between the bunk 18 and the trailer is designated by the numeral 22. In view of the length of the load 14, it is necessary that the trailer 12 be steerable in order that curves can be negotiated.

Reference is now made to FIGS. 2 and 3 wherein is shown a trailer 12 having a conventional frame portion 24 supported by wheels 26 on axles 28. The trailer includes a reach guide 30 and a reach 32. The pivot connection 22 between the bunk 18 and the trailer comprises a conventional cup and saucer connection 34. The trailer has side rub bars 36 on the frame for providing support of the bunk at the sides in its pivotal movement relative to the trailer. The structure thus far described comprises conventional trailer structure.

In accordance with the invention, a horizontal rearwardly extending frame portion 38 is welded or otherwise secured to the frame 24 with the upper surface thereof in the plane of and forming an extension of the upper surface of the rub bars 36.

The frame portion 38 is tapered rearwardly to a smaller dimension and has a rear cross portion 40 connecting side portions 42, the top surfaces of the side portions 42 comprising the extensions of the rub bars 36.

A pair of fluid operated cylinder assemblies 46 and 47 have one end, such as their base end, pivotally connected at 48 to the cross portion 40 of the frame 38, and their other end, such as the piston rod end, pivotally connected to ears 50 welded or otherwise secured to the rear side of bunk 18. With selected operation of the fluid operated cylinders, a turning force is established between the bunk and the frame of the trailer. Preferably, the cylinders 46 and 47 are double acting whereby when one is extending the other is retracting, and vice versa.

With reference to FIGS. 2, 3 and 4, an enclosure or housing 54 is secured on the frame 24 of the trailer under the frame extension 38, as by bolts 56 or other suitable securing means. This enclosure has a reservoir 58 at one end thereof and supports therein a fluid operated pump 60, and an electric motor 62 for driving the pump. Pump 60 is in communication with the reservoir 58 and a piping system to be described hereinafter. Also included in the enclosure 54 is a valve 64 having a structure to be described hereinafter and associated with a pair of solenoids 66 and 68 arranged to control the operation of the fluid operated cylinders 46 and 47 through the valve. Motor 62 is powered by storage battery means 70 also contained in the enclosure 54.

FIG. 5 shows a wiring and piping diagram for the invention. Pump 60 is in communication with the reservoir 58 by a conduit 74 and with the rearward end of the fluid cylinder 46 by a conduit 76. A branch conduit 78 extends from conduit 76 to the forward end of fluid operated cylinder 47 whereby, as is apparent, when the pump supplies pressure in the conduit 76 the fluid operated cylinder 46 is extended and fluid operated cylinder 47 retracts. A conduit 80 leads from the rearward end of fluid operated cylinder 47 and a branch conduit 82 therefrom leads to the forward end of the fluid operated cylinder 46 whereby when the pump supplies pressure in the conduit 80, cylinder 47 is extended and cylinder 46 is retracted.

Conduits 76 and 80 lead into the valve 64, and this valve has a core 84 with a pair of passageways 86 arranged in one position of the core to establish communication between the pump and the fluid operated cylinders for extending fluid operated cylinder 46 and retracting fluid operated cylinder 47. A conduit 88 communicates between one of the passageways 86 of the core 84 and the reservoir 58. The core 84 of the valve has reverse passageways 90 which upon shifting of the core by selected operation of the solenoids are brought into communication with the conduits 76 and 80 and 88 to reverse the drive function of the fluid operation cylinders. Valve 64 is normally centered, and in such centered or inoperative position a by-pass passageway 91 establishes communication between conduits 74 and 88 to the reservoir.

Also with reference to FIG. 5, a switch 92 is part of an electric circuit, and this switch is located in the tractor. It has a pair of contacts 94 and 96 and is self centering. A wire 98 leads from the switch to the solenoid 66 as well as to motor 62 and a wire 100 leads from contact 96 to solenoid 68 and also to motor 62. It is apparent that upon movement of the switch against contact 96, as shown in FIG. 5, the motor 62 is placed in operation and the solenoid 68 is energized. In the energized condition of solenoid 68, the core 84 of the valve 64 provides for extension of fluid operated cylinder 46 and retraction of fluid operated cylinder 47. By moving the switch 92 against contact 94, the solenoid 66 is energized which moves the valve core 84 in a position to reverse operation of the fluid operated cylinders 46 and 47. The switch 92 being a self-centering switch will render the system inoperative when released by the operator.

A relief valve 100 is incorporated in the conduit 74 for safety relief. Also, a valve 102 is disposed in a conduit 104 connected between conduit 78 and 80. The conduit 104 comprises a bypass and is used in functions of the operation, now to be described.

The present invention is intended for use on trailers which haul extremely long loads. In such conditions, the reach 32 is disconnected from the tractor and moved rearwardly in the reach guide 30 to be out of the way. The trailer is thus pulled by engagement of the load on the bunk 18.

When it is desired to negotiate a curve, the operator moves the switch 92 in the selected direction to apply a turning force to the trailer. Since the bunk is integral with the load and cannot turn, the forces applied by the fluid operated cylinders turn the trailer under the load. With reference to FIG. 6, the solenoid operated valve 64 instead of being associated with a hand operated switch and connecting wires may have its solenoids operated by a radio receiver 106. The receiver is arranged to be operated by a transmitter, not shown. Such a transmitter may be carried in the tractor itself or in a following vehicle, and in this latter case, the following vehicle can assist in steering of the trailer either in forward movement down the highway or reverse movement in a loading or yard area. Valve 102 is closed when the trailer is in operation with the reach disconnected from the tractor but is opened when the reach is connected so that the fluid operated cylinders can move freely and allow pivotal movement of the bunk and trailer frame.

According to the present invention, a compact unit is provided which is simplified and is arranged for easy adaptation to a trailer structure. In addition, the only control means extending between the trailer and the tractor comprises electrical wires which can be readily connected and suspended to be out of the way. The wiring would include an electrical connection between the alternator of the vehicle and the battery 70 to maintain the latter in charged condition.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A steerable trailer for hauling elongated loads wherein the load comprises the pulling connection between a pulling tractor and the trailer, comprising
   a. a wheel supported frame,
   b. a bunk pivotally supported on said frame for supporting the rear of the long load and forming the pulling connection for the trailer with the load,
   c. a pair of extendable drive means connected between said bunk and said frame and arranged to pivot said frame relative to said bunk for steering the trailer,
   d. electrical power operated means on said trailer operating said drive means,
   e. and electric circuit control means for said electrical power operated means for selectively controlling the latter.

2. The steerable trailer of claim 1 wherein said electric circuit control means comprises electric wiring arranged to extend from said electrical power operated means to the pulling tractor.

3. The steerable trailer of claim 1 wherein said electric circuit control means comprises radio receiving means associated with said electrical power operated means for operating the same and remotely located transmitter means for operating said radio receiving means.

4. The steerable trailer of claim 1 wherein said electric power operated means comprises an electric motor and storage battery means electrically connected thereto.

5. The steerable trailer of claim 1 wherein said electric power operated means comprises an electric motor and storage battery means electrically connected thereto, said extendable drive means comprising fluid operated cylinders, and pump means driven by said electric motor having fluid drive connection with said cylinders.

6. The steerable trailer of claim 1 wherein said extendable drive means comprises fluid operated cylinders, pump means on said trailer driving said fluid operated means, said electric power operated means comprising an electric motor and storage battery electrically connected thereto, said electric circuit control means comprising a solenoid operated valve, switch means arranged to be disposed in the tractor, and electric wiring arranged to extend between said solenoid operated valve and said switch means.

7. The steerable trailer of claim 1 including rub bar means at the sides of the trailer arranged to support said bunk in relative pivot movements of said bunk and frame, a rearwardly extending frame portion leading from said rub bar means, said extendable drive means being connected at one of its ends to said rearwardly extending frame portion.

* * * * *